Nov. 9, 1937.  F. A. FURLONG  2,098,383
HEATING SYSTEM
Filed July 8, 1933  3 Sheets-Sheet 1

Inventor
Francis A. Furlong
by [signature]
Attorney

Nov. 9, 1937.   F. A. FURLONG   2,098,383
HEATING SYSTEM
Filed July 8, 1933   3 Sheets—Sheet 2

Fig. 5.

Pilot Light Off, Furnace Cold.   Fig. 6.

Pilot Light On, Furnace Cold.   Fig. 7.

Pilot Light On, Furnace Hot.   Fig. 8.

Inventor
Francis A. Furlong
by Ju. W. McConkey
Attorney

Nov. 9, 1937.  F. A. FURLONG  2,098,383

HEATING SYSTEM

Filed July 8, 1933  3 Sheets—Sheet 3

Inventor
Francis A. Furlong
by M. W. McConkey
Attorney

Patented Nov. 9, 1937

2,098,383

UNITED STATES PATENT OFFICE 2,098,383

HEATING SYSTEM

Francis A. Furlong, Chicago, Ill., assignor to Autogas Corporation, Chicago, Ill., a corporation of Delaware Application July 8, 1933, Serial No. 679,521

21 Claims. (Cl. 236—9)

This invention relates to heating plants and the like, and to their automatic control. An object of the invention is to provide a simple plant and to improve the system of control to give more uniform temperature in the space being heated.

In the usual automatically-controlled heating systems, the temperature is regulated by a room thermostat in the space to be heated. Usually the thermostat operates switch contacts or the like to open and close one or more electric circuits which control the operation of the furnace or an equivalent heating medium. The uniformity then depends chiefly on two factors: (1) the sensitivity of the heating system, and the rapidity with which the heat supplied thereby is distributed throughout the space to be heated; and (2) the sensitivity of the thermostat proper. The present invention aims to improve the heating system and the distribution of heat.

Any heating system necessarily lags behind its control. After the control is set for more heat the heat of combustion must first be transferred to the heat-circulating medium, then this must circulate through radiators or the like and transfer the heat to the air in the room or other space being heated, and then the heat must distribute itself with some uniformity in this space and thereby affect the control thermostat.

Since the furnace or its equivalent usually continues to operate until again turned off by the thermostat upon the desired rise in temperature, this lag usually means that the temperature in the room will then overshoot the desired maximum on account of the continued transfer to the air in the room of the heat which is in process of circulation at the time the furnace is turned off.

Thus the lag in the system usually causes the temperature to rise some 2° or more, after combustion has been shut off in the furnace. If the thermostat is set to start combustion at 70° and shut it off at 72°, the room temperature will first drop below 70° due to this lag, and after combustion is shut off the room temperature will rise to 74° or more before it begins to drop again.

This means that the heating plant is operated continuously for a relatively long time, sufficient to raise the room temperature four degrees or more, and is then shut off for a correspondingly long time; it also means that there is a very considerable fluctuation in the room temperature, and further that when the occupants of the room become accustomed to the higher temperature of say 74° they will find the normal temperature of 70° uncomfortable. Moreover, in some heating systems, with the long period of inoperation, the air in the room may stratify, so that the air at chair level is substantially below 70° before the thermostat reaches 70°, giving a condition known as a "cold 70".

The principal object of the present invention is to obviate all of these difficulties by keeping the room temperature more nearly uniform and avoiding any substantial fluctuations. During the day, when a substantially uniform temperature at a predetermined level is desired, I prefer to accomplish this result by turning on combustion, or providing heat in any other manner, whenever the room temperature drops to a predetermined level, e. g. 70°, and then turning it off again not in accordance with the room temperature but as soon as the heating system has been supplied a definite quantity of heat. In other words, I anticipate the "lag", and supply heat to the system until it contains a sufficient "load" of heat to raise the room temperature a predetermined amount, e. g. to 70.5°.

By providing an on-and-off control of this character, in effect I supply the room with successive increments or substantially equal quantities of heat, each sufficient to raise the room temperature a known amount of say one-half degree, the room thermostat ordinarily determining only the lower limit of room temperature. However, I prefer as a safety measure to arrange the thermostat also to shut off the heat automatically at some higher level (e. g. 72°) if something goes wrong.

In the morning, however, it is sometimes desired to have the heating plant operate continuously until the room temperature rises to the desired minimum of say 70°. I have therefore designed my novel system in one of its embodiments to cause the heating plant to operate continuously so long as the room temperature is below the minimum for which the thermostat is set, and after attaining that temperature to turn on the heating plant whenever the room temperature drops to that minimum and each time to turn the heating plant off again as soon thereafter as the temperature within the heating plant attains a predetermined level, regardless of the exact room temperature at that time. In another embodiment, suitable for use where continuous operation is not so important, this feature is omitted, thereby permitting the use of a simpler circuit and arrangement which also has certain advantages discussed herein. The two embodiments are intended for use in somewhat different conditions, and I regard both of them as important.

In the apparatus illustrated in the drawings, and which is especially well adapted for operating according to my novel system, heat is supplied to a structure of ceramic refractories, which become incandescent and transmit their heat to the walls of furnace or its equivalent principally by radiation. This structure in effect forms a reservoir for storing a certain quantity of heat, and I find it convenient to control the shutting off of the fuel in the above-described cycle when this incandescent structure attains a predetermined temperature range. The burner or base of this heating plant also embodies certain features of novelty having to do with the introduction of the fuel and air into a mixing tube leading to the burner.

In the particular system shown, the furnace or its equivalent is controlled by a double circuit having arranged therein several thermostatic switches. Preferably there is one circuit for turning on the heating plant and which has included therein the room thermostat, or preferably one blade of a two-blade room thermostat with the other blade arranged as a safety device to open the circuit in any event if the room temperature rises too high.

This circuit is shown arranged in the first embodiment, when rendered operative, to close another parallel or shunt circuit, for example by the closing of a switch by the opening of a fuel valve, which remains closed (to hold the valve open) regardless of the room temperature and the opening of the contacts of the room thermostat, unless of course the room gets hot enough to operate the above-mentioned safety device by opening the second blade of the thermostat or its equivalent, until the opening of another thermostatic switch in the heating plant and which is shown controlled by the temperature attained by the incandescent ceramic structure.

Another feature of the invention relates to arranging this latter thermostat in a novel combination with a second safety device which includes a thermostat controlled by the pilot light of the furnace, and so arranged that if the pilot light goes out both of the above circuits are automatically opened at once, regardless both of room temperature and of furnace temperature. These two thermostats in the heating plant in themselves embody substantial novelty in their connections, in their arrangement, and in their mounting.

In the second embodiment, there is at all times an on-and-off control, actuated at its lower limit according to the room temperature and at its upper limit by the temperature of the heating plant. This is intended particularly for small houses and the like. This embodiment, however, also has a pilot-controlled safety switch.

The above and other objects and features of the invention, including various novel combinations and desirable particular constructions, will be apparent from the following description of the system illustrated in the accompanying drawings, in which.

The illustrated furnace 10 of the first modification (shown in Figures 1-8) is shown as having a firebox 12, with an ashpit 14 below it (the grates having been removed), there usually being a door 16 communicating with the firebox (and which may be permanently closed if desired since it is not used after the conversion burner is in operation), and there being a side opening 18 into the ashpit which opening is preferably covered by a suitable plate 20 (in lieu of the firebox door, which may be removed) which has an opening fitting over the conversion burner described below.

My novel conversion burner preferably includes the usual sheet-metal rectangular elongated outer casing 22, supported on adjustable legs 24 or the like at its front end and on means such as a firebrick 26 at its rear end, and which supports at its rear end within the firebox of the furnace a built-up ceramic heat-radiating structure 28 more fully described, and claimed, in application No. 576,076, filed November 19, 1931, by Ashur U. Wetherbee. The casing 22 is provided at its front end with a wall 30 having adjustable shutter blades 32 admitting the supply of secondary air to the interior of the casing.

Within the casing 22 is arranged longitudinally of the casing, a fuel-air mixing conduit or tube 34 having at its rear end a burner 36 such as the one described and claimed in application No. 513,568, filed February 5, 1931, by Arthur B. Cunningham, and provided with supporting lugs 38 or the like adapted to be bolted or otherwise secured to the base of the structure 28 and to the top of the casing 22.

Figures 1, 4, 15:
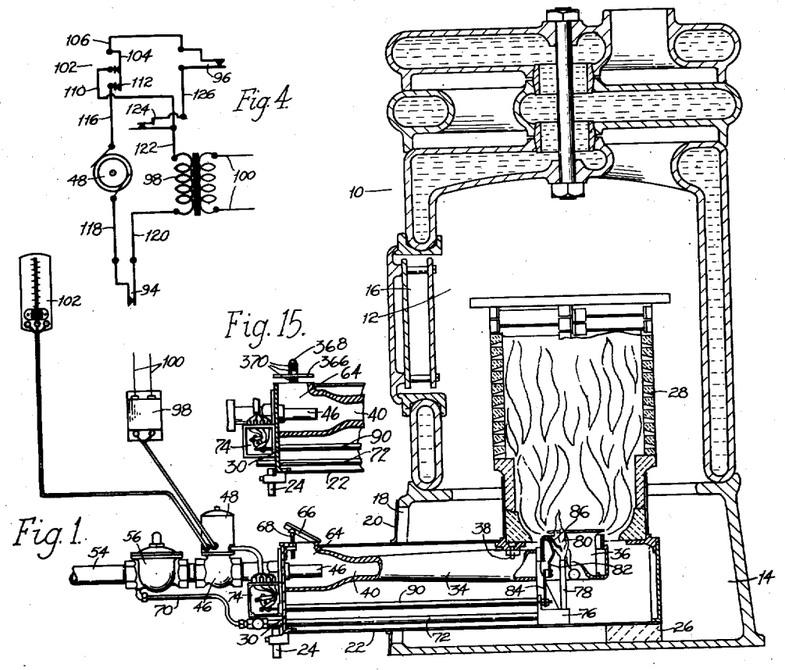
Figure 1 is a diagrammatic view of the system, with a furnace forming the heating plant shown in vertical section.
Figure 4 is a wiring diagram.
Figure 15 is a partial section corresponding to part of Figure 1, but showing a modified adjustment for the primary air opening.
Figure 5:
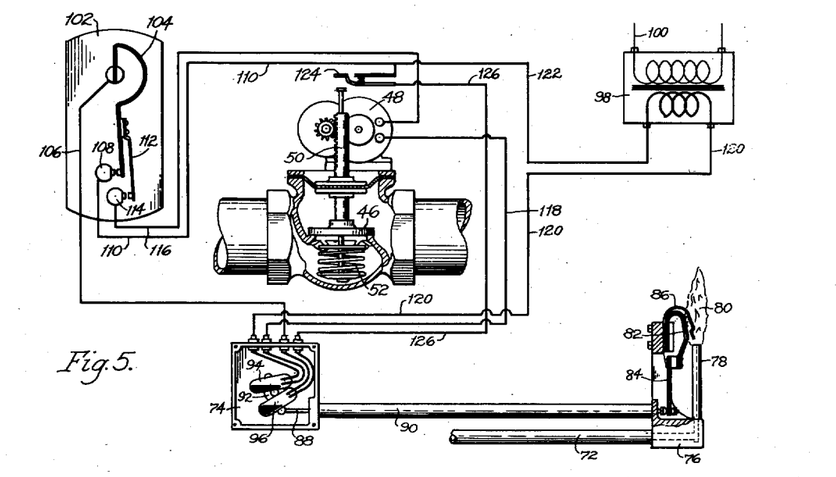
Figure 5 is a diagram of the fuel valve and the furnace control switches, with the electrical control circuit shown diagrammatically.

The mixing conduit 34 may be formed with the usual mixing venturi or constricted passage 40, into the open mouth of which there discharges (through a restricted orifice in an orifice plate 42) a fuel nozzle 44 controlled by a valve 46 operated by a standard valve motor (or solenoid) 48 actuating the stem 50 of the valve against the resistance of a valve spring 52. As shown in Figure 1, the upper part of the valve with its motor is inclosed in a cap or housing, which in Figure 5 is omitted. Fuel is supplied to the valve 46 from a gas line 54 through a standard pressure-regulating valve 56.

The fuel nozzle 46 has a flange 58 engaging the front face of the front wall 30 of the casing 22 opposite the end of the mixing conduit 34, and bolts or the like 60 passing therethrough fasten the nozzle and the wall 30 and the closed front end of the mixing conduit 34 all rigidly together.

According to one feature of the invention, casing 22 has at the center of its top face, at the front end of the casing, a primary-air opening registering with the open top of an air box 64 which forms the front end of the mixing conduit 34, ahead of the venturi 40.

A cover 66 is pivoted over said primary-air opening, resting on a setscrew 68 or the like adjustably threaded into a lug in the front end of conduit 34 and which can be adjusted (by turning back cover 66) to vary the effective size of the primary air opening. Cover 66 can turn freely upward (for example in case of delayed ignition), but its rear edge engages the top of casing 22 before it attains a fully-vertical position, so that it always falls back by gravity against the adjustable stop 68.

Just ahead of the pressure-regulating valve 56, there is a branch fuel conduit 70 for the pilot leading to a rigid pipe or conduit 72 having a switch box 74 at its forward end and carrying at its rear end, beside and below the burner 36, a pilot head 76 having the usual pilot burner 78 constantly burning with a flame 80.

Adjacent the pilot burner 78 is arranged a novel thermostatic control including an upper thermostat element 82 and a lower thermostat element 84, which may be of the bimetallic leaf type. The upper thermostat element 82 is in the form of a loop, with its end secured to the top of the pilot-burner head 76, and with its lower end connected by a suitable joint, which may be of a heat-insulating character if desired, to the upper end of the element 84, which may normally be substantially straight.

Surrounding and partially protecting the looped element 82 is a metal deflector or finger 86 which projects directly into the pilot flame 80 and deflects a part of that flame directly against the looped element 82, which is therefore very sensitively controlled by the presence or absence of the pilot.

The deflector 86 not only causes part of the pilot flame to travel lengthwise along the thermostat element 82; it also becomes itself sufficiently highly heated to affect this element both by radiation and by conduction through their common mounting.

The lower end of the thermostat element 84 universally engages the rear end of a switch rod 88, which may if desired pass through a guide tube 90. If the tube 90 is used it, with the conduit 72, serves as a rigid connection between the pilot burner head 76 and the switch box to form a unitary rigid subassembly which includes all of the pilot mechanism. Since the switch rod 88 is inclosed within the casing 22 the tube 90 is not an essential part of the assembly.

While the upper thermostat element 82 is responsive principally to the presence or absence of the pilot flame, the lower element 84 is responsive almost entirely to the ambient furnace temperature, and particularly (since the heat in the above-described conversion burner is furnished predominantly as radiant heat from the structure 28 when it becomes incandescent) to the temperature attained by the incandescent ceramic structure 28.

The switch rod 88 is connected at its forward end to a pivoted switch carrier 92, having mounted thereon a safety pilot switch 94, illustrated as a mercury-tube switch, and a second switch 96 (also shown as a mercury tube switch mounted at a different angle) which is controlled as explained below according to the temperature of the combustion zone of the furnace, i. e. principally by the temperature of the structure 28 and the heat radiated therefrom.

Figure 6:
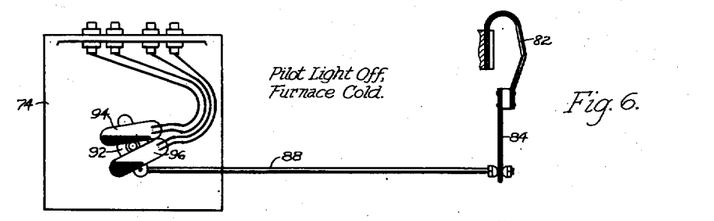
Figures 6, 7, and 8 are diagrammatic sections showing the different positions of the thermostatic switches at the furnace.
Figure 7:
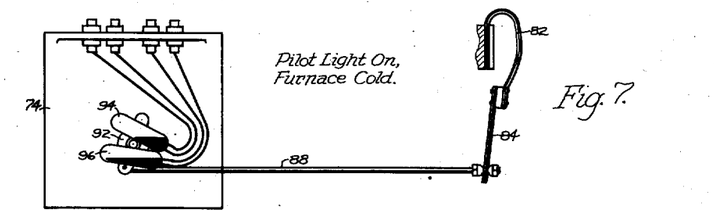
Figure 8:
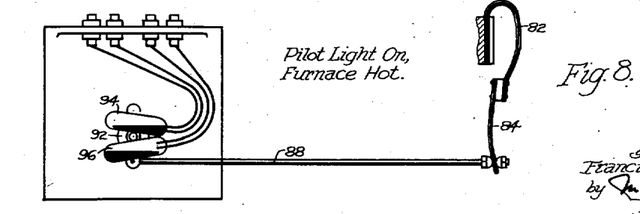

The connected thermostats and their corresponding switches have three usual positions, shown respectively in Figure 6, Figure 7, and Figure 8. In Figure 6 (also in Figure 5) they are shown before the furnace is started, and before the pilot is lit. In this position, both of the switches 94 and 96 are open. When the pilot is lit, on starting up the furnace, element 82 takes up the position of Figure 7, and since element 84 is still cold both of the switches 94 and 96 are closed. When the furnace heats up, element 84 curves as shown in Figure 8, in the opposite direction to the heat-induced curvature of element 82, and moves the switch carrier 92 back to an intermediate position in which the safety switch 94 is still closed but the control switch 96 is open.

There are two unusual positions of the switches and thermostats not shown specifically in the drawings. Regardless of the condition of element 84, if the pilot goes out the element 82 moves the switch carrier 92 to the position of Figure 6 (or beyond, if element 84 is hot at the time) thereby opening both switches. And if something goes wrong with the heating system, and the furnace attains a dangerous temperature, element 84 curves further than shown in Figure 8 and opens safety switch 94 as well as switch 96. In the ordinary cycle of operation of the heating system, with everything going as it should, these two abnormal positions are not attained; they are purely safety features, but are nevertheless important.

The operation of the furnace is intended to be controlled by means of a novel system of temperature-controlled electrical circuits, which in themselves embody a very important feature of the invention, and which facilitate the control of the system according to a novel method which is also an important phase of the invention. These novel circuits are intended to control the furnace, or an equivalent heating unit, or by a simple reversal of the operation a cooling unit which I intend also to be regarded as the equivalent of the described heating plant, by operating the valve motor 48 or its equivalent to open and close the fuel valve 46, the motor being shown operated by current from the secondary of a suitable transformer 98 connected in a power circuit 100 such as a house lighting circuit.

Preferably these novel circuits are controlled by means such as a standard room thermostat 102 in the space whose temperature is to be regulated. This thermostat is shown as having a main blade 104 having an electrical connection 106 at the end at which it is mounted, and adapted to engage or move away from a contact 108 to which is connected a lead 110. The circuit from 106 to 110 is closed through engagement of the thermostat blade 104 with the contact 108 at a predetermined desired minimum room temperature (e. g. at 70° F.).

The thermostat also has mounted on the main blade 104 an auxiliary flexible resilient blade 112 adapted to engage another contact 114 at a somewhat higher desired maximum temperature (e. g. 72° F.), to make connections with a lead 116 which may be connected directly to one binding post of the valve motor 48. The other binding post of the valve motor is connected by a lead 118 to the safety pilot-controlled switch 94, which in turn is connected by a lead 120 to one terminal of the secondary of the transformer 98.

The other terminal of the transformer secondary (or an equivalent source of power) is connected by a lead 122 to a switch 124 which is automatically opened by the closing of valve 46 and automatically closed by the opening of the valve, as shown diagrammatically in Figure 5. This switch has two connections, one of which is the above-mentioned lead 110 from contact 108 of the room thermostat and which is continuously connected to lead 122 whether the switch 124 is open or closed. The other connection is through the switch 124 and a lead 126 to the switch 96, the other side of which is connected to the lead 106 from the fixed end of the room thermostat blade 104.

In operation, with the room cold (i. e. below the minimum which is usually set at 70°), blade 104 engages the contact 108 and blade 112 resiliently engages the contact 114, but switches 94 and 96 are both open, and valve 46 therefore remains closed.

The pilot is now lighted. As soon as it heats up element 82, the parts move to the position of Figure 7, closing both switches 94 and 96, but switch 124 is still open. This closes a circuit from transformer 98, through leads 122 and 110 to contact 108, through blades 104 and 112 to contact 114, through lead 116 to the valve motor 48, thence via lead 118 and the safety switch 94 and via lead 120 back to the other terminal of the secondary of the transformer.

This causes the valve motor 48 to open the fuel valve 46, supplying fuel to the furnace for ignition by the pilot, and at the same time closes the valve switch 124.

There are now two circuits closed. As before, current passes from the transformer 98 through leads 122 and 110, contact 108, blades 104 and 112, contact 114, lead 116, motor 48, lead 118, switch 94, and lead 120 back to the transformer. There is also now a second closed circuit, in parallel or shunt with the first, beginning with the transformer 98, through lead 122 to the switch 124 (now closed), thence via lead 126 and switch 96 and lead 106 to the blade 104 at its base, thence via contact 114 and lead 116 through the valve motor 48, via lead 118 and safety switch 94 and lead 120 back to the transformer.

It is evident that the first of these two circuits is controlled by the opening and closing of the blade 104 and contact 108, while the second is controlled by the opening and closing of the furnace-temperature regulating switch 96. While this condition obtains, therefore, we have continuous operation of the furnace, regardless of the open or closed condition of switch 96, until the desired minimum room temperature (i. e. 70°) is attained, thus heating up the room to this temperature in the shortest possible time.

Ordinarily before this temperature is attained the switch 96 will have been opened, opening the second circuit, so that when thermostat blade 104 leaves contact 108 at 70° the furnace is automatically turned off, and the system "coasts" along on the heat stored up in the system.

The important difference between this phase of my invention, and the practice heretofore followed, is that the furnace does not continue to operate until maximum permissible room temperature of 72° is attained, and then "coasts" on up perhaps to 74° after the furnace is turned off; the furnace is turned off when the minimum room temperature of 70° is attained, and "coasts" on only to perhaps 70.5°.

When the room temperature again drops to 70° the first circuit is again closed, and as soon as the valve opens the second circuit again closes (assuming that switch 96 had closed during the cooling-off period), and the furnace again operates until the contact at 108 is opened and also the switch 96 has opened as another increment of heat has been stored in the furnace. We have at this stage, therefore, an on-and-off control between close limits of about one-half degree in the room temperature, and at the same time we secure maximum efficiency of the furnace by preventing the system from cooling off too much and tend to keep it at a more uniform temperature.

If any circumstance causes the room temperature to rise to 72°, contact 114 is opened and the furnace is automatically turned off until the room temperature again drops below 70°; this, however, does not occur in ordinary operation, and may be regarded as a desirable safety feature. Also, of course, at any time the pilot goes out the switch 94 is opened and the fuel is shut off until somebody again lights the pilot.

When heating up the room in the morning, by this method of control, we have continuous furnace operation until the desired minimum of 70° is attained, thus heating up the room in the shortest possible time. During the day we have in effect an on-and-off control, with the furnace turned on each time the room temperature drops to 70° and remaining on until the furnace heats up again sufficiently to open the switch 96 and contact 108.

This daytime operation is in some ways similar to the on-and-off operation described and claimed in my prior application No. 515,375, filed February 12, 1931, of which the present application is a partial continuation, and which is further described below.

My improved method of on-and-off operation may be regarded, from one point of view, as a relay arrangement by which when the room temperature drops to a predetermined minimum, a holding circuit for causing operation of the furnace is automatically closed, which holding circuit is thereafter broken (independently of the room temperature) by the attainment of a predetermined range of temperature in the combustion zone of the furnace. This is a substantial improvement over prior "on-and-off" controls in which both the making and the breaking of the holding circuit is controlled by the room temperature, in that in effect it anticipates the "lag" in the heating effect by measuring that effect at the furnace instead of at the room.

Figures 9, 10, 11, 12, 13, 14:
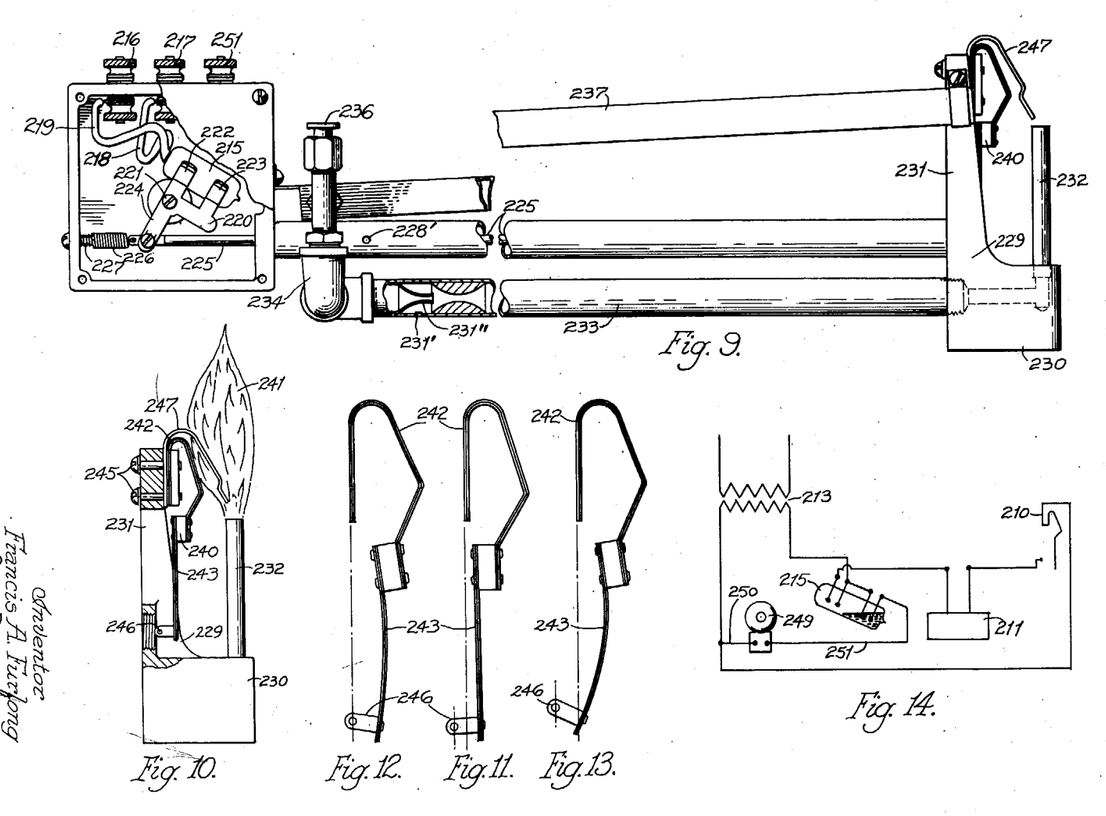
Figure 9 is a side elevation, partly broken away, of the pilot and associated parts in a modified system, the disclosure of which is continued herein from my prior application No. 515,375.
Figure 10 is an enlarged view of the pilot burner of Figure 9, with the pilot flame just lighted.
Figures 11, 12, and 13 are side elevations of the thermostat of Figure 9, in different positions.
Figure 14 is a wiring diagram of the system of Figure 9.

Another advantageous embodiment of this invention is shown in Figures 9–14 in its application to a domestic heating system for maintaining the temperature of a dwelling or room at a predetermined point. In such a system, as before pointed out, a temperature thermostat is usually placed in a room or other enclosure, the temperature of which is to be maintained constant, and is designed to regulate the heating plant in such manner as to maintain the temperature of such room or enclosure at a desired point. A conventional type of such a system is illustrated in the diagram of Figure 14, and which includes a single-blade room thermostat 210 connected in series with a valve 211 for controlling the supply of fuel to the main burner or burners of the heating plant, which may be substantially as previously described. The thermostat is so arranged that when the surrounding temperature falls below a predetermined point the circuit is closed and the valve opens to admit fuel to the burner, which then increases the temperature to the point desired at which time (in the arrangement of Figure 14) the thermostat breaks the circuit, thus closing the valve to discontinue the heating unless the valve has previously been closed as explained below by the rise in the temperature of the heating plant.

The illustrated heating system is intermittently operated and employs a constantly burning pilot for igniting the fuel when supplied to the burner. In order to shut off the supply of fuel to the main burner when the pilot light is inoperative, in the same general manner as in the first embodiment, means responsive to the temperature of the pilot light is provided for breaking the electrical circuit thereby closing the main valve even if the room thermostat calls for heat during such inoperative condition of the pilot.

One type of such means is represented in Figure 14 as a mercury switch 215, which is connected in series with the thermostat 210 and valve 211, it being understood that this switch is moved to and held in closed position as long as the pilot light is operative, but which automatically operates to break the circuit when the pilot light is inoperative. Current for the electrical system is supplied by means such as the transformer 213 connected to the lighting system of the building.

Referring now to the exemplary embodiment of the invention illustrated in Figure 9, the numeral 214 designates a suitable housing enclosing a circuit maker 215 in the form of a switch, preferably of the tiltable mercury contactor type, wherein the electrodes are bridged by a body of mercury that is moved to and fro upon shifting of the switch from one position to another. The electrodes of the switch are connected to the terminal posts 216 and 217 by suitable flexible leads or connections 218 and 219 respectively and the switch is carried by a tiltable support 220 mounted to pivot about the axis 221 and provided with suitable gripping fingers 222 and 223 for holding the switch in position on the support. The support is provided with a depending arm 224 suitably connected to an operating rod 225 operated by a temperature responsive element later to be described.

A spring 226 or the like is provided for maintaining the rod 225 and thermal element under light tension for moving the switch to open position upon rupture or disengagement of the thermal element, support, operating rod, or the connections therebetween. The spring is connected to the rod 225 although it may be otherwise connected to the support 220 at one end while the other end is connected to a screw 227 which is preferably adjustable whereby the tension of the spring may be varied in keeping with conditions of installation. While the spring thus serves a useful purpose it is not absolutely essential and may be dispensed with if desired.

A hollow tube 228 connected at one end to the housing and at its other end to the pilot head 229 provides a suitable enclosure for the rod 225. Openings 228' are provided in tube 228, preferably adjacent the housing, for the admission of secondary air which passes thru the tube to the pilot frame. The base 230 of the pilot seat is provided with an upstanding portion 231 and a counter-bore communicating with the pilot burner 232 supplied with gas from the conduit 233, which is preferably provided with openings 231' and a nozzle 231'' cooperating with a Venturi throat. Passage of the gas thru the nozzle aspirates primary air thru the openings and this admixture of gas and air is discharged from and burns at the tip burner 232 as illustrated in Figure 10.

A by-pass 234 communicating with the conduit 233 and provided with a manually controlled valve 236 supplies gas to the pilot lighter and tester, which as shown, comprises a hollow member 237 secured at one end to the housing 214 and at its other end to the portion 231 of the pilot head, and terminating in proximity to the upper end of the pilot 232. When it is desired to light the pilot, valve 236 is depressed permitting gas to flow into the lighter 237. This gas may be conveniently ignited as from a match thru a suitable opening, near the valve, and the ignited gases travel up this lighter to the end thereof and ignite the gas issuing from the pilot burner. When it is desired to ascertain if the pilot light is burning, all that is necessary is to depress the valve whereupon the unignited gas flows up the lighter 237, is ignited by the pilot light, if the same is burning, and flashes back to the manually controlled valve. The pilot lighter 237 itself forms the subject matter of a separate application and is not specifically claimed in this one.

As a means for operating the circuit maker 215 and for preventing the admission of fuel to the main burner, at times when such admission might result in a dangerous condition, as when the pilot flame is extinguished or is dangerously low, a thermally actuated element 240 is placed in proximity to the flame 241 of the pilot burner. This thermal element may comprise a plurality of metals having different coefficients of expansion which, when subjected to a temperature, has the property of changing its shape from a straight line to an arc of a circle or from the arc of a circle to a straight line, as for example a bi-metallic leaf thermostat.

In the present instance, the thermal element 240 preferably comprises a substantially U-shaped portion 242 and a substantially straight portion 243 secured to one of the legs of the U as illustrated in Figure 10, this being substantially the same arrangement as in Figures 1–8. The other leg of the U 242 is secured to the upstanding portion 231 of the base by securing elements 245 and the lower end of the portion 243 is provided with a connection 246 adapted to be secured to the end of the rod 225 for actuating the circuit maker 215 upon deflection of the element in response to the thermal conditions to which it is subjected.

The portions 242 and 243 of the thermal element (as in the first embodiment described above) are assembled in such manner that the upper portion 242, when subjected to the temperature of the pilot light, has a tendency of straightening out while the lower portion 243, when subjected to temperature, moves or bows in the opposite direction as illustrated in Figure 12 which represents the normal position of the element when the pilot light is operating.

In order that the thermal element respond primarily to the temperature of the pilot light, in the manner explained in connection with the first embodiment, a deflector 247 is provided for deflecting a small portion of the flame 241 against the portion 242. The deflector is substantially U-shaped and is adapted to be secured to the upstanding portion 231 of the base and preferably by the securing means 245. The deflector extends upwardly and over the portion 242 and has a portion thereof adjacent its free end offset towards the bi-metallic element to provide an enlarged space intermediate the bi-metallic element in which the diverted portion of the flame burns. With a portion of the main pilot flame diverted directly on to the thermal element, the operation of the element will be in direct proportion to the intensity of the flame and will, therefore, form an accurate control. That is, if the flame is diminished to such an extent as to become a menace, the thermal element will not be sufficiently heated to maintain the circuit closer in closed position thereby preventing subsequent admission of gases to the main burner which would be dangerous due to delayed ignition.

This type of control is advantageous in that the deflected portion of the pilot flame is more representative of the character of the pilot flame than that type of control which relies upon lateral flames, issuing from ports in the side of the pilot burner to actuate the thermal element. These lateral flames are not necessarily representative of the condition of the main flame for if the latter is diminished or out by virtue of the flame port being restricted by accumulations thereon the lateral flames will be intensified with the result that the thermal element will operate all the more strongly to hold the control system on operation position when it should be thrown on safety.

In addition to diverting the flame on to the thermal element, the deflector also functions as a partial shield to prevent foreign substances from dropping down on top of the pilot and it also acts as a stop for limiting outward movement of the thermal element 242.

Under normal operating conditions with the pilot light burning, the thermal element assumes a position such as illustrated in Figure 12, wherein the mercury switch 215 is moved to and maintained in closed position. With the parts in this position when the thermostat 210 calls for heat, fuel is supplied to the burner and the burner operates in the usual manner being turned on and off in response to the demands of the thermostat. If for any reason the pilot light should become extinguished or dangerously reduced in size, the bi-metallic element 242 will contract to its normal position and shift the mercury switch to the position illustrated in Figure 9 wherein the control circuit is broken thereby preventing the supply of fuel to the burner, even though the room thermostat calls for an increase in heat.

With the thermal elements thus arranged, should the temperature of the furnace become excessive, as by down drafts or for any other reason, the lower member 243 of the thermal element, which is normally only slightly heated, will be highly heated by the downwardly directed heat from the furnace, and will assume a position such as illustrated in Figure 13 thereby moving the mercury switch to open position to discontinue the supply of the fuel to the burner. However, upon removal of the dangerous condition the member 243 assumes its normal position, as in Figure 12, and if the pilot light is still burning the switch will be moved to closed position and the circuit closed in the normal manner whereupon the furnace will resume normal operation. This is an important feature of the invention since it is possible with a single device to provide two necessary controls, that is, a control to discontinue the supply of fuel to the burner when the pilot light is inoperative and a control to discontinue the supply of fuel to the burner when a dangerous condition arises due to over-heating of the furnace and to restore the system to operative position after the dangerous condition has passed.

Besides the safety features previously explained the thermostatic unit is adapted to regulatory control for the purpose of compensating the inherent temperature lag between the heating unit and the space to be heated, in the manner previously explained. In domestic installations, as hereinbefore pointed out, the heating plant is usually located in a central point and the heat distributed therefrom to the various points to be heated, as for example, the rooms of a dwelling. In this type of installation the heat is transmitted thru suitable conveyors to the various rooms and since considerable time is taken in the transmission of the heat, the temperature of the rooms lags behind the temperature of the furnace.

With a control thermostat located at a point remote from the heating plant, as in a room, it is obvious that, with the temperature of the thermostat lagging behind the actual temperature of the heating unit, in the ordinary method of operation, when the the thermostat discontinues the heat the residual heat of the unit will be transmitted to the room where the thermostat is located and thereby raise the temperature of such room to an undesirable extent. This undesirable overshooting of the temperature may be eliminated, either as explained in describing the first embodiment of the invention or as described below, by interrupting the firing of the heating unit independently of the room thermostat, so as to allow the residual heat of the unit to distribute itself to the room where the thermostat is located.

In the present embodiment the lower portion 243 of the thermal element is as before made sensitive to respond to the ambient temperature of the furnace so that after it has been in operation for a certain time, of from thirty minutes to one hour, it will break the control circuit independently of the room thermostat. After the furnace has cooled down, by dissipation of the heat to the rooms, the thermostat again closes the control circuit so that it is again placed under the control of the room thermostat.

In other words, the heating of the furnace is in stages, the time between successive stages depending upon the type of furnace and the manner of transferring the heat to the various points where it is to be used, and each stage being set in operation by the room thermostat and cut off by the heating plant thermostat. By operating in stages, the residual heat of the furnace will be given an opportunity to distribute itself to the various rooms and thereby avoid overrunning of the temperature of such rooms, and the room temperature may be held within very narrow limits. This is an important feature not only from a point of view of health but from an economic standpoint also.

In the normal operation of domestic heating system requiring a continuously burning pilot, it is possible for the pilot to become inoperative and remain in inoperative condition for a considerable length of time without the knowledge of the occupants or attendant and in order to apprise the attendant or occupant of this dangerous condition, it is sometimes desirable to have a signaling device which becomes operative upon the pilot becoming inoperative. This signal device, if used, may comprise either visible or audible signals and in the present instance, a buzzer 249 is shown connected in series with the switch 215 through leads 250 and 251 so that its circuit will be closed when the switch is moved to an inoperative position for giving a warning that the pilot light is in an inoperative condition.

Figures 2, 3, 16, 17:
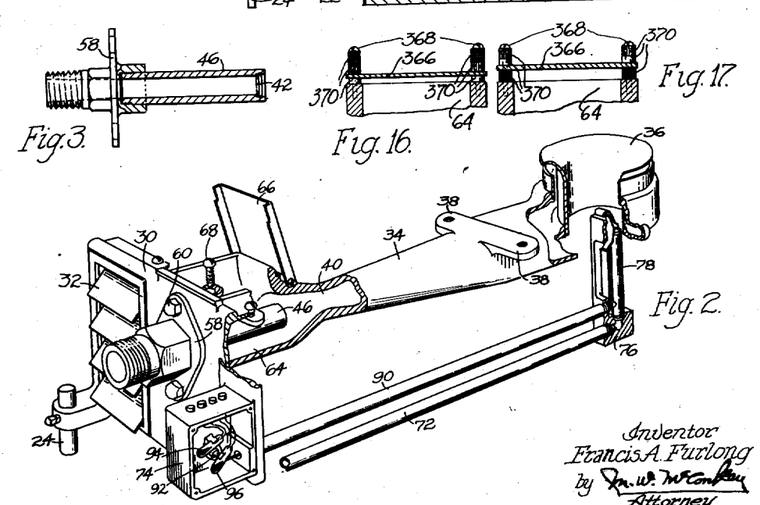
Figure 2 is a perspective view of the elongated conversion burner, broken away to show the means for introducing the fuel and the air.
Figure 3 is a plan view of the fuel-injecting nozzle, broken away to show the orifice plate at the discharge end.
Figures 16 and 17 are partial sections showing differently-adjusted positions of the construction of Figure 15, and on a larger scale than Figure 15.

In Figures 15, 16, and 17 is shown a modified form of adjustment for the primary air opening 64. In this arrangement, it is intended that a definite number (e. g. three) of the plates 42 be furnished the customer, with different sizes of openings therein, and that a corresponding number of fixed adjustments be provided for the primary air opening 64. This is feasible with my construction because of the fact that the effect of an orifice in a thin plate such as the plate 42, as distinguished from an opening through a nozzle or tube, is substantially constant even though the pressure of the gas may change considerably, and therefore fixed corresponding adjustments may be used for the primary air opening.

In this modified arrangement, then, the opening 64 is restricted to a fixed degree by a cover plate 366 mounted over the opening by means of screws or bolts or the like fastenings 368 passing through sets of spacers 370 corresponding in number (three being shown) to the orifice plates 42 furnished the customer.

Spacers 370 are of different heights, to give primary-air openings of fixed size corresponding to the different orifice plates 42. The respective orifice plates 42 and the corresponding spacers 370 may be painted the same color, or otherwise marked to indicate which spacers are to be below cover plate 366 when a given orifice plate 42 is used.

While one illustrative apparatus and system of circuits has been described in detail, it is not my intention to limit the scope of my invention by that description, or otherwise than by the terms of the appended claims. As stated above, the present application is in part a continuation of my application No. 515,375, filed February 12, 1931.

I claim:

1. A heating system comprising a room-temperature control device having a first thermostatic switch set for a lower limit and a second thermostatic switch set for an upper limit and having an intermediate range, a heating plant having a combustion chamber, an electrical device controlling the operation of said plant, a third thermostatic switch controlled by the combustion chamber temperature, and an electrical control system for said electrical device having parallel circuits one of which includes the first and second thermostatic switches and the other of which includes the second and third thermostatic switches, together with a pilot-controlled safety switch automatically operable to open both circuits if the pilot of said plant goes out.

2. A heating system comprising a room-temperature control device having a first thermostatic switch set for a lower limit and a second thermostatic switch set for an upper limit and having an intermediate range, a heating plant, an electrical device controlling the operation of said plant, a third thermostatic switch controlled by the heating-plant temperature, and an electrical control system for said electrical device having parallel circuits one of which includes the first and second thermostatic switches and the other of which includes the second and third thermostatic switches, together with a fourth pilot-controlled switch, said first and second and fourth switches being in series in one circuit and said second and third and fourth switches being in series in the other circuit.

3. A heating system comprising a heat-storage medium including a ceramic structure adapted to be heated to incandescence, means for supplying heat thereto, a room thermostat having control connections to said means and set to turn off said means when the room temperature attains a predetermined limit, a second thermostat also having control connections to said means and controlled by the temperature of said medium and operative, when the room temperature is in a range below said limit and the room thermostat connections are in "on" position, to turn the heating means alternately on for a period long enough to heat said structure to incandescence and then off while the heat stored therein is being drawn upon to heat said room, and means for transferring heat from said structure to the room continuously whether said means is turned "on" or "off" by said second thermostat.

4. A thermostatic device comprising a thermal loop rigidly mounted at one end and having an adjacent pilot burner to heat the loop to expand it as long as the burner remains lighted, and having secured to its free end by a heat-insulating joint a normally-straight thermal element movable in response to a rise in the surrounding temperature in a direction tending to offset the expansion of said loop by said burner, and an actuating connection at the end of said element opposite said loop.

5. A pilot device, for use with a main burner, comprising a burner for producing a pilot flame, an adjacent thermostat having its length beside and extending along the advancing flame, and a deflector arranged in said flame and deflecting a portion thereof to advance along the length of the thermostat.

6. A pilot device, for use with a main burner, comprising a burner for producing a pilot flame, an adjacent thermostat having its length beside and extending along the advancing flame, and a deflector arranged in said flame and deflecting a portion thereof to advance along the length of the thermostat and arranged alongside the thermostat in such a manner as to influence the thermostat by radiation as it becomes highly heated in the flame.

7. A pilot device, for use with a main burner, comprising a burner for producing a pilot flame, an adjacent thermostat having its length beside and extending along the advancing portion thereof, and a deflector arranged to deflect a portion of said flame onto the thermostat to advance along the length of the thermostat, said thermostat and deflector having a common mounting in engagement with each other at their ends, whereby the deflector as it becomes highly heated by the flame serves to heat the thermostat by conduction.

8. A pilot burner, for producing a pilot flame for a main burner, in combination with a control thermostat beside said flame, and means arranged in said flame for deflecting a portion of the pilot flame directly against the thermostat to wipe thereagainst as the flame advances.

9. In a safety control system for burners, a continuously burning pilot, a thermal element adjacent said pilot but not in contacting relation therewith, means partially encircling and protecting said element and which means is positioned to deflect a portion of the pilot flame into proximity to said element to heat the same and a control means operatively connected to said element.

10. In a safety control system for burners, a pilot, a thermal element in proximity to said pilot, a deflector positioned to deflect a portion of the pilot flame on to said thermal element and which is arranged as a protective guard about said element, and a control means controlled by the movement of said element.

11. In a safety control system for burners, a continuously burning pilot, a thermal element adjacent said pilot and responsive to the heat thereof to be heated thereby but out of contact, a deflector positioned to direct a portion only of the pilot flame on to said thermal element, a common mounting for the deflector and said element and control means actuated by said element.

12. In a control system for a furnace or the like, a continuously burning pilot flame, thermostatic control means comprising two elements positioned to move in opposite directions in response to temperature changes and located in proximity to the flame, a deflector positioned to deflect a portion of the pilot flame on to one of said elements only to heat the same by said flame, the other element being exposed to and actuated by the furnace temperature, and control means for said furnace operatively connected to said elements to be actuated by joint movement thereof to turn on the fuel supply upon the heating up of the first portion of the thermal element and to turn off the fuel supply again upon the attainment of a predetermined temperature range by the second portion of said element.

13. In a safety control system for a furnace or the like having a main burner with fuel-supply means and a circuit controlling the supply of fuel by said means to the main burner and utilizing a continuously burning pilot for igniting the main burner, thermostatic control means composed of two elements positioned to move in opposite directions, said means being exposed to the ambient temperature of the furnace and one of said elements being located in heating proximity to said pilot, and a circuit closer in said circuit operatively connected to the thermostatic means to be moved to and maintained in closed position by the said one element thereof in response to the temperature of the pilot when the ambient furnace temperature is below a predetermined range and to be moved to open position by said element upon extinguishment of said pilot and to be moved to open position by the other element of said thermostatic means upon attainment of said predetermined range of ambient furnace temperature even though said pilot is still burning.

14. A safety pilot comprising in combination a pilot burner, a temperature responsive means located in proximity to said burner, and means positioned to divert a portion of the flame issuing from said burner on to said temperature responsive means and which means encircles and protects one side of the temperature responsive means.

15. A safety pilot device comprising in combination a continuously burning pilot, a thermal element located adjacent to the pilot flame but out of contact therewith, and a deflector carried by said device and encircling one end of said element and positioned to divert a portion of said flame on to said thermal element.

16. A safety device comprising in combination a larger burner, a continuously burning burner forming a flame adapted to serve as a pilot flame for a larger burner, thermostatic means comprising a plurality of mechanically-connected elements positioned to move in reverse directions with one of said elements in proximity to said pilot flame, a deflector positioned to divert a small part of said flame to the adjacent element, and a control device to control said larger burner connected to said thermostatic means and which is turned off if neither of said elements is heated and which is turned on, if the surrounding temperature is below a predetermined range, by the heating of said adjacent element by said flame, and which is again turned off by the action of the other element of the thermostatic means when the surrounding temperature attains said predetermined range.

17. A safety device for use with a furnace pilot burner or the like and comprising in combination with a pilot burner a continuously responsive means including two connected thermal elements positioned to expand in opposite directions, one of said elements anchored at one end adjacent said pilot burner, a deflector positioned to deflect a portion of the flame of the pilot burner against said latter thermal element, the other thermal element being actuated in response to a predetermined surrounding temperature range in the opposite direction to the first element and in effect cancelling the actuation of the first element by the pilot burner flame.

18. In a safety control system for a furnace having a furnace having a main burner, a continuously burning pilot having a flame for igniting the burner, thermostatic control means including a plurality of elements positioned to move in opposite directions in response to temperature changes, one of said elements being responsive to the heat of the pilot and the other to the heat of the furnace, a fuel-supplying-controlling main circuit for the main burner, a shunt circuit, a circuit closer connected to the thermostatic means and actuated thereby to close the main circuit and open the shunt circuit when the pilot flame is burning and the furnace temperature below a predetermined degree and to open the main circuit and close the shunt circuit when the pilot flame is extinguished or unduly diminished or the furnace temperature above said predetermined degree, and a signal in said shunt circuit to be actuated thereby upon extinguishment or diminution of the pilot flame or increase of the furnace temperature.

19. As an article of manufacture, an assembly including a pilot head carrying a pilot burner, and a thermal element mounted on said head and located in proximity to said burner, a deflector also mounted on said head and positioned to deflect a portion of the flame issuing from said burner on to said thermal element, a housing spaced from said head, a tiltably mounted mercury switch mounted in said housing, a rigid tube connection between said housing and pilot head and a connection between said thermal element and tiltably mounted mercury switch and passing lengthwise through said rigid tube.

20. In a safety control system a furnace, a main burner in the furnace, a control valve for the burner outside of the furnace, a continuously burning pilot adapted to be arranged within the furnace adjacent the main burner, a deflector to separate the pilot flame into two portions, a thermal element engaged by one of said flame portions, control means for said control valve adapted to be arranged outside of said furnace, and a relatively long movable connection operatively connecting the thermal element and the control means.

21. A furnace for a heating plant or the like comprising, in combination with a main burner having fuel-feeding means and a control device for said means, a pilot burner, a single connection from the control device extending adjacent the pilot burner, and thermal means in two connected portions expansible in opposite directions in response to temperature changes, operatively connected to said connection and one of which is affected by the flame of the pilot burner, said portions upon being heated tending respectively to shift said connection in opposite directions.

FRANCIS A. FURLONG.

CERTIFICATE OF CORRECTION.

Patent No. 2,098,383.   November 9, 1937.

FRANCIS A FURLONG.

It is hereby certified that error appears in the printed specification of the above numbered patent requiring correction as follows: Page 7, second column, line 7, claim 2, after the word "plant" and before the comma insert having a combustion chamber; line 10, same claim, for "heating-plant" read combustion chamber; and that the said Letters Patent should be read with these corrections therein that the same may conform to the record of the case in the Patent Office.

Signed and sealed this 22nd day of February, A. D. 1938.

(Seal)

Henry Van Arsdale,
Acting Commissioner of Patents.

to deflect a portion of the flame issuing from said burner on to said thermal element, a housing spaced from said head, a tiltably mounted mercury switch mounted in said housing, a rigid tube connection between said housing and pilot head and a connection between said thermal element and tiltably mounted mercury switch and passing lengthwise through said rigid tube.

20. In a safety control system a furnace, a main burner in the furnace, a control valve for the burner outside of the furnace, a continuously burning pilot adapted to be arranged within the furnace adjacent the main burner, a deflector to separate the pilot flame into two portions, a thermal element engaged by one of said flame portions, control means for said control valve adapted to be arranged outside of said furnace, and a relatively long movable connection operatively connecting the thermal element and the control means.

21. A furnace for a heating plant or the like comprising, in combination with a main burner having fuel-feeding means and a control device for said means, a pilot burner, a single connection from the control device extending adjacent the pilot burner, and thermal means in two connected portions expansible in opposite directions in response to temperature changes, operatively connected to said connection and one of which is affected by the flame of the pilot burner, said portions upon being heated tending respectively to shift said connection in opposite directions.

FRANCIS A. FURLONG.

CERTIFICATE OF CORRECTION.

Patent No. 2,098,383.   November 9, 1937.

FRANCIS A FURLONG.

It is hereby certified that error appears in the printed specification of the above numbered patent requiring correction as follows: Page 7, second column, line 7, claim 2, after the word "plant" and before the comma insert having a combustion chamber; line 10, same claim, for "heating-plant" read combustion chamber; and that the said Letters Patent should be read with these corrections therein that the same may conform to the record of the case in the Patent Office.

Signed and sealed this 22nd day of February, A. D. 1938.

(Seal)

Henry Van Arsdale,
Acting Commissioner of Patents.

CERTIFICATE OF CORRECTION.

Patent No. 2,098,383. November 9, 1937.

FRANCIS A FURLONG.

It is hereby certified that error appears in the printed specification of the above numbered patent requiring correction as follows: Page 7, second column, line 7, claim 2, after the word "plant" and before the comma insert having a combustion chamber; line 10, same claim, for "heating-plant" read combustion chamber; and that the said Letters Patent should be read with these corrections therein that the same may conform to the record of the case in the Patent Office.

Signed and sealed this 22nd day of February, A. D. 1938.

(Seal)

Henry Van Arsdale,
Acting Commissioner of Patents.